Figure 1:
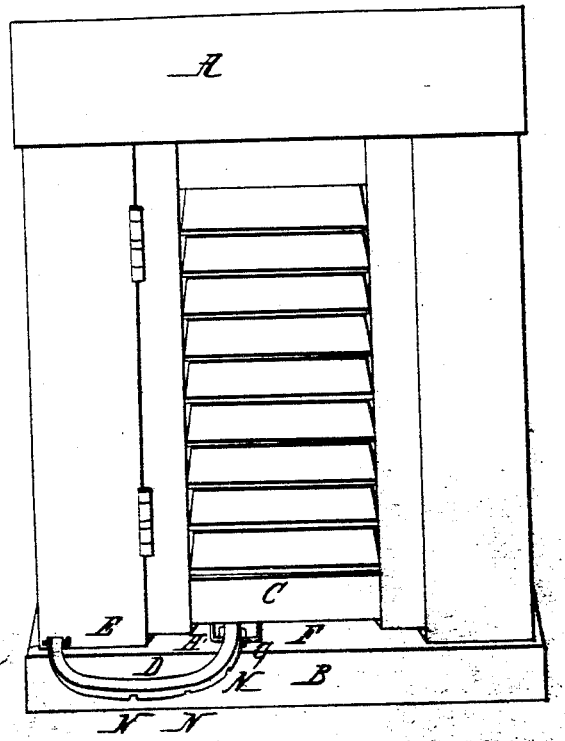
Figure 2:
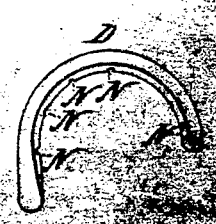

CLOSURE FASTENERS

EXAMINERS' BOOK

BEST AVAILABLE COPY

H. A. Frost,

Shutter Fastener.

No. 143. A. I. Patented May 6, 1856.